United States Patent
Dandoko

(10) Patent No.: US 9,756,218 B2
(45) Date of Patent: Sep. 5, 2017

(54) IMAGE FORMING APPARATUS

(71) Applicant: KYOCERA Document Solutions Inc., Osaka (JP)

(72) Inventor: Takushi Dandoko, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/280,337

(22) Filed: Sep. 29, 2016

(65) Prior Publication Data

US 2017/0099413 A1 Apr. 6, 2017

(30) Foreign Application Priority Data

Oct. 1, 2015 (JP) .................... 2015-196273

(51) Int. Cl.
*H04N 1/44* (2006.01)
*H04W 12/08* (2009.01)

(52) U.S. Cl.
CPC ......... *H04N 1/4433* (2013.01); *H04N 1/4426* (2013.01); *H04W 12/08* (2013.01); *H04N 2201/006* (2013.01); *H04N 2201/0094* (2013.01)

(58) Field of Classification Search
CPC .................................................. H04N 1/4433
See application file for complete search history.

(56) References Cited

U.S. PATENT DOCUMENTS

| | | | |
|---|---|---|---|
| 2008/0052777 A1* | 2/2008 | Kawano | H04L 9/088 726/18 |
| 2009/0103124 A1* | 4/2009 | Kimura | G06F 3/1204 358/1.15 |
| 2013/0201132 A1* | 8/2013 | Kunioka | G06F 3/041 345/173 |

FOREIGN PATENT DOCUMENTS

JP 2005-109843 4/2005

\* cited by examiner

*Primary Examiner* — Ibrahim Siddo

(57) ABSTRACT

A user detecting unit detects a mobile identification device in a communicable range of a wireless communication device, and determines a user in association with the detected mobile identification device and determines user authority of the user among general user authority and administrator user authority. The general user authority is prohibited from using a specific function allowed to the administrator user authority. The login processing unit performs a login process based on the detected user authority for the user. If the mobile identification device with the administrator user authority is detected after the login process based on the general user authority and a distance is less than a predetermined value between the detected mobile identification devices with the general user authority and the administrator user authority, then the authority changing unit changes the user authority of the user from the general user authority to the administrator user authority.

6 Claims, 4 Drawing Sheets

IMAGE FORMING APPARATUS

CROSS-REFERENCE TO RELATED APPLICATIONS

This application relates to and claims priority rights from Japanese Patent Application No. 2015-196273, filed on Oct. 1, 2015, the entire disclosures of which are hereby incorporated by reference herein.

BACKGROUND

1. Field of the Present Disclosure

The present disclosure relates to an image forming apparatus.

2. Description of the Related Art

An image processing apparatus detects a neighboring tag using near field wireless communication, obtains identification information from the tag, and determines a level corresponding to the obtained identification information, and when detecting plural tags, determines a level corresponding to a combination of respective levels corresponding to the plural tags and sets usage authority corresponding the determined level on the apparatus.

Meanwhile, an image processing apparatus has a specific function that a user with general user authority is prohibited from using but a user with administrator user authority can use. Therefore, when a general user wants to use such specific function, the general user calls an administrator user and needs the administrator user to login.

In the aforementioned image forming apparatus, if a tag of administrator user authority exists in a communicable range of near field wireless communication, a general user always can use such specific function, and consequently it is not favorable in the view of security.

SUMMARY

An image forming apparatus according to an aspect of the present disclosure includes a wireless communication device, a user detecting unit, a login processing unit, and an authority changing unit. The user detecting unit is configured to (a) detect a mobile identification device in a communicable range of the wireless communication device, and (b) determine a user in association with the detected mobile identification device and determine user authority of the user among general user authority and administrator user authority, the general user authority prohibited from using a specific function and the administrator user authority allowed to use the specific function. The login processing unit is configured to perform a login process based on the user authority for the user determined by the user detecting unit. The authority changing unit is configured to change the user authority of the user from the general user authority to the administrator user authority if (a) the mobile identification device with the administrator user authority is detected by the user detecting unit after the login process was performed based on the general user authority and (b) a distance is less than a predetermined value between the detected mobile identification device with general user authority and the detected mobile identification device with administrator user authority These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
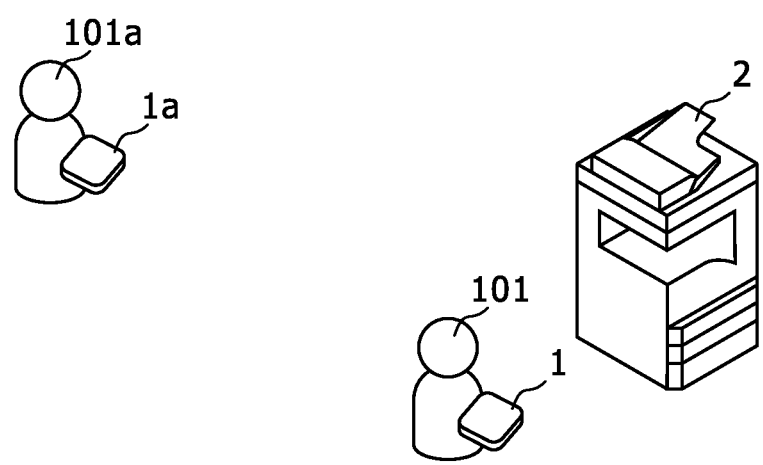
FIG. 1 shows a diagram that indicates a configuration of an image forming system that includes an image forming apparatus according to an embodiment of the present disclosure.

FIG. 1 shows a diagram that indicates a configuration of an image forming system that includes an image forming apparatus according to an embodiment of the present disclosure. In the system shown in FIG. 1, a general user 101 carries a mobile identification device 1 such as a portable small-sized terminal device or a smart phone that has a unique identifier and is used in an indoor positioning system such as iBeacon (trademark), and an administrator user 101a carries a mobile identification device 1a, and further an image forming apparatus 2 (such as a multi function peripheral or a copier) is installed.

When the mobile identification device 1 or 1a is located around the installation location of the image forming apparatus 2, the image forming apparatus 2 performs communication with the mobile identification device 1 or 1a for example using near field wireless communication, and thereby detects the mobile identification device 1 or 1a.

Figure 2:
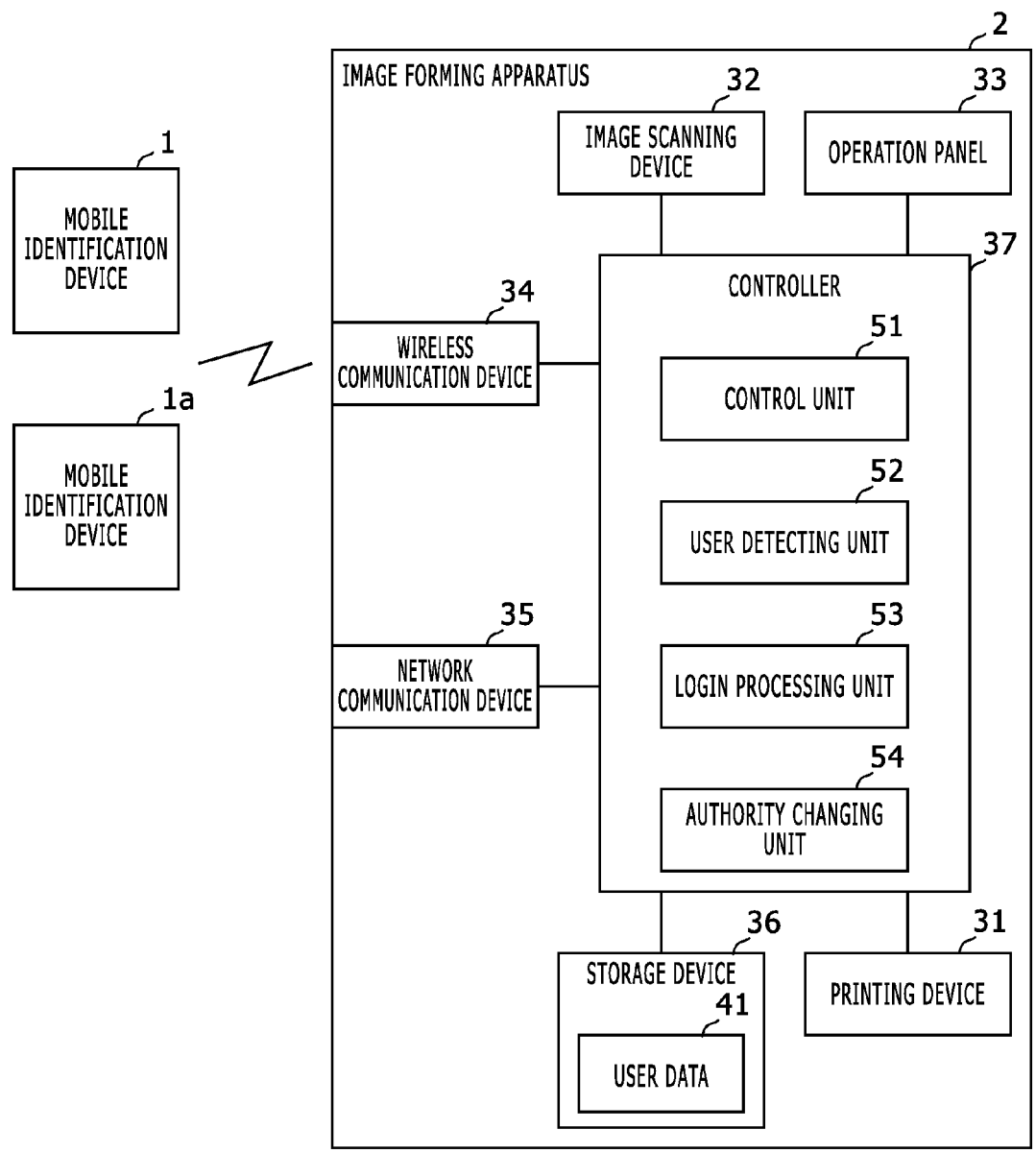
FIG. 2 shows a block diagram that indicates a configuration of the image forming apparatus 2 according to an embodiment of the present disclosure.

FIG. 2 shows a block diagram that indicates a configuration of the image forming apparatus 2 according to an embodiment of the present disclosure.

In FIG. 2, the image forming apparatus 2 is a multi function peripheral or the like used by registered plural users, and includes a printing device 31, an image scanning device 32, an operation panel 33, a wireless communication device 34, a network communication device 35, a storage device 36, and a controller 37.

The printing device 31 is an internal device that prints each page image based on print image data on a paper sheet using electrophotography.

The image scanning device 32 is an internal device that optically scans a document image of a document and thereby generates image data (i.e. scanning data) of the document image.

The operation panel 33 is arranged on a surface of a housing of the image forming apparatus 2, and includes a display device that displays sorts of information to a user and an input device that detects a user operation. For example, a liquid crystal display is used as the display device. A key switch, a touch panel or the like is used as the input device.

The wireless communication device 34 is an internal device that performs data communication according to a predetermined near field wireless communication standard that can detect the mobile identification devices 1 and 1a. The network communication device 35 is a circuit that is connected to a network and performs data communication with another apparatus connected to the network.

Further, the storage device 36 is a nonvolatile storage device such as a flash memory or a hard disk. In the storage device 36, user data 41 and the like are stored.

The user data 41 includes, for each user, a device identifier of the mobile identification device 1 or 1a assigned to the user, and user identification information associated with the device identifier. The user identification information includes a user ID, a user authority (general user authority or administrator user authority) and the like.

Further, the controller 37 includes a computer, ASIC (Application Specific Integrated Circuit) and/or the like, and controls internal devices of the image forming apparatus 2. The controller 37 executes a program using the computer and thereby acts as a control unit 51, a user detecting unit 52, a login processing unit 53, and an authority changing unit 54.

The control unit 51 causes an internal device such as the printing device 31 to perform an action for a function specified by an instruction from a user if the specified function is allowed to the user's user authority among sorts of functions. This means that if a function is not allowed to user authority of a user then the function is not performed in accordance with an instruction of this user.

The user detecting unit 52 (a) detects the mobile identification device 1 or 1a in a communicable range of the wireless communication device 34, and (b) using the user data 41, determines a user in association with the detected mobile identification device 1 or 1a and determines user authority (general user authority or administrator user authority) of the user.

The general user authority is prohibited from using a specific function. The administrator user authority is allowed to use the specific function. For example, the specific function includes editing specific setting data.

The login processing unit 53 performs a login process for a user based on user authority of the user determined by the user detecting unit 52 using the user data 41. The login process, for example, establishes association between the user and a process that will be performed after the login process and before a logout process.

Further, after the login process, if the mobile identification device 1 or 1a of the user for whom the login process was performed gets not detected by the wireless communication device 34 and the user detecting unit 52, the login processing unit 53 performs a logout process for this user. The logout process, for example, releases the aforementioned association established in the login process.

Further, after changing the user authority of the user for whom the login process was performed with the general user authority from general user authority to administrator user authority, when the mobile identification device 1 with general user authority gets not detected, the login processing unit 53 performs a logout process for this user.

In addition, if the mobile identification device 1a with administrator user authority is detected by the user detecting unit 52 after performing the login process with general user authority, then the login processing unit 53 does not perform the login process for the user of the detected mobile identification device 1a with administrator user authority.

If (a) the mobile identification device 1a with administrator user authority is detected by the user detecting unit 52 after the login process was performed based on the general user authority and before a logout process is performed for this user and (b) a distance is less than a predetermined value between the detected mobile identification device 1 with general user authority and the detected mobile identification device 1a with administrator user authority, the authority changing unit 54 changes the user authority of the user from general user authority to administrator user authority.

For example, the aforementioned threshold value is set as a distance as same as a current distance between the image forming apparatus 2 and the mobile identification device 1 with general user authority at this time.

In this embodiment, while (a) the mobile identification device 1a with administrator user authority is detected by the user detecting unit 52 after the login process was performed based on the general user authority and (b) a distance between the detected mobile identification device 1 with general user authority and the detected mobile identification device 1a with the administrator user authority is less than a predetermined value, after detecting a predetermined user operation, the authority changing unit 54 displays a predetermined operation unit (a soft key or the like), detects a predetermined user operation to the operation unit (pressing down the soft key or the like) using the operation panel 33, and thereafter changes the user authority of the user (i.e. the user in a login status) from general user authority to administrator user authority.

In addition, in this embodiment, after changing the user authority of the user for whom the login process was performed based on the general user authority from general user authority to administrator user authority, when the mobile identification device 1a with administrator user authority gets not detected before the mobile identification device 1 of this user gets not detected using the wireless communication device 34 and the user detecting unit 52, the authority changing unit 54 changes the user authority of this user from administrator user authority to general user authority.

Figure 3:
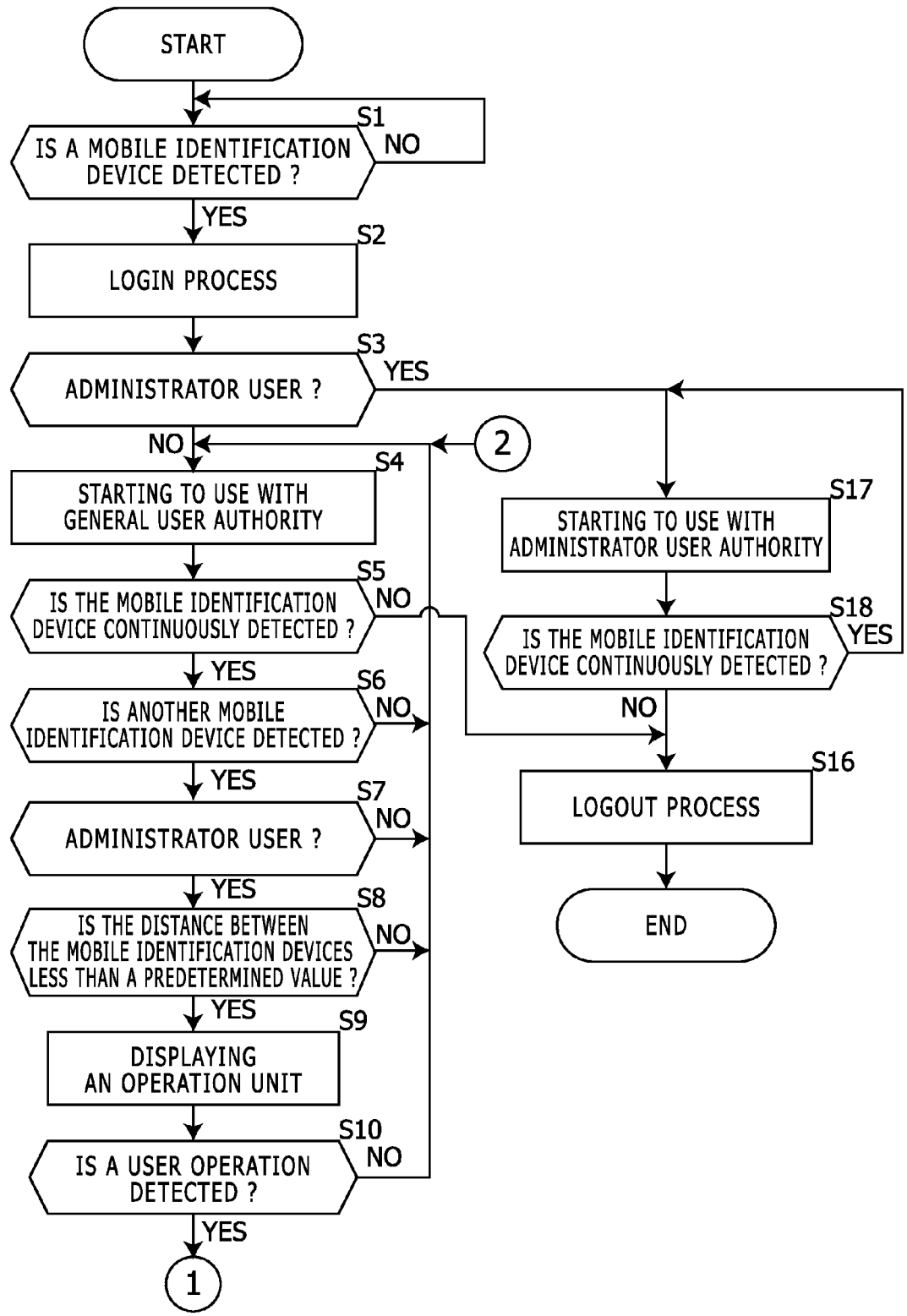
FIG. 3 shows a flowchart that explains a behavior of the image processing apparatus 2 shown in FIG. 2 (1/2)
Figure 4:
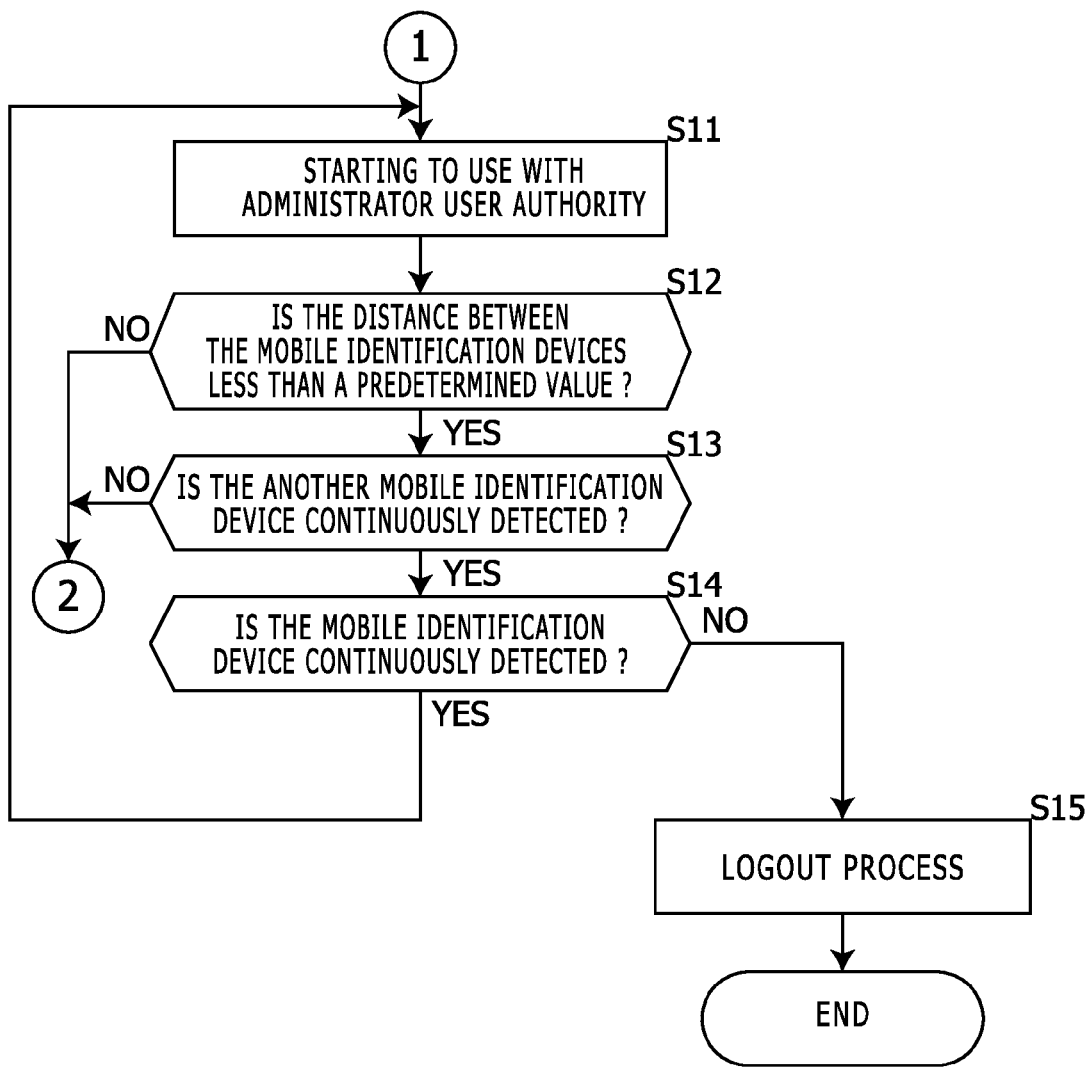
FIG. 4 shows a flowchart that explains a behavior of the image processing apparatus 2 shown in FIG. 2 (2/2).

The following part explains a behavior of the image forming apparatus 2. FIGS. 3 and 4 show a flowchart that explains a behavior of the image processing apparatus 2 shown in FIG. 2.

The user detecting unit 52 continuously checks whether the mobile identification device 1 or 1a exists in a communicable range of the wireless communication device 34 or not using the wireless communication device 34 (in Step S1).

When detecting the mobile identification device 1 or 1a, the user detecting unit 52 obtains a device identifier of the detected mobile identification device 1 or 1a, and determines (a) a user associated with the device identifier and (b) user authority of this user on the basis of the user data 41.

Subsequently, for the determined user, the login processing unit 53 performs a login process based on the user authority of the determined user (in Step S2). For this login process, no user operations are required.

The control unit 51 determines whether the user authority of the user for whom the login process was performed (hereinafter, called "login user") is administrator user authority or not (in Step S3).

If the user authority of the login user is not administrator user authority, then the user starts to use a function allowed to general user authority and the control unit 51 performs an action of such function according to an instruction from the user (in Step S4).

Thereafter, the authority changing unit 54 continuously checks whether the detected mobile identification device 1 is continuously detected or not (in Step S5) and continuously checks whether another mobile identification device 1 or 1a than the detected mobile identification device 1 is newly detected or not (in Step S6).

If another mobile identification device 1 or 1a is newly detected, then the authority changing unit 54 determines whether user authority of a user determined by the user detecting unit 52 of this another mobile identification device 1 or 1 is administrator user authority or not (in Step S7).

If the user authority of this another mobile identification device 1a is administrator user authority, then the authority changing unit 54 determines positions of the detected two mobile identification devices 1 and 1a, determines a distance between the both devices on the basis of the positions, and determines whether the determined distance is less than a predetermined value or not (in Step S8). For example, the positions of the mobile identification devices 1 and 1a are determined on the basis of intensities and directions of electric waves from the devices 1 and 1a , respectively.

If the determined distance is less than the predetermined value, then the authority changing unit 54 displays an operation unit on the operation panel 33 (in Step S9), and determines whether the operation unit is operated or not while displaying the operation unit (in Step S10).

If a user operation to the operation unit is detected by the operation panel 33, then the authority changing unit 54 changes the user authority of the login user from general user authority to administrator user authority (in Step S11). Thereafter, the login user can use a function allowed to administrator user authority.

Contrarily, if another mobile identification device 1 or 1a is not detected in Step S6, the user authority of another mobile identification device 1 or 1a is not administrator user authority in Step S7, the distance between the two mobile identification devices 1 and 1a is not less than the predetermined value in Step S8 or no user operations to the operation unit are detected in Step S10, then the user authority of the login user is kept as general user authority.

Further, if the distance between the two mobile identification devices 1 and 1a gets not less than the predetermined value, then displaying the operation unit is terminated.

After changing the user authority of the login user from general user authority to administrator user authority, if the distance between the two mobile identification devices 1 and 1a gets not less than the predetermined value (in Step S12) or the mobile identification device 1a of the administrator user 101a gets not detected (in Step S13), then the authority changing unit 54 changes the user authority of the login user from administrator user authority back to general user authority (in Step S4).

In addition, after changing the user authority of the login user from administrator user authority to general user authority, if the mobile identification device 1 of the general user 101 gets not detected (in Step S14), then the login processing unit 53 performs a logout process for the login user (in Step S15).

Further, if the mobile identification device 1 gets not detected in Step S5, then the login processing unit 53 performs a logout process for the login user (in Step S16).

If the user authority of the firstly detected mobile identification device is administrator user authority (in Step S3), then the user starts to use a function allowed to administrator user authority and the control unit 51 performs an action of such function according to an instruction from the user (in Step S17). Thereafter, if the mobile identification device 1a of this user gets not detected (in Step S18), then the login processing unit 53 performs a logout process for the login user (in Step S16).

As mentioned, in this embodiment, the user detecting unit 52 (a) detects the mobile identification device 1 or 1a in a communicable range of the wireless communication device 34, and (b) determines a user in association with the detected mobile identification device 1 or 1a and determines user authority of the user. The login processing unit 53 performs a login process based on the determined user authority for the determined user. If (a) the mobile identification device 1a with administrator user authority is detected after the login process was performed based on the general user authority and (b) a distance is less than a predetermined value between the detected mobile identification device 1 with general user authority and the detected mobile identification device 1a with administrator user authority, the authority changing unit 54 changes the user authority of the user from general user authority to administrator user authority.

Consequently, burden is reduced for a login operation of the administrator user 101a, and in a proper situation, the general user 101 can use a specific function available to administrator user authority.

For example, if the general user 101 as a login user called the administrator user 101a and the both users are close to each other, then administrator user authority is automatically provided to the general user 101; but even if the mobile identification device 1a of the administrator 101a is detected in a communicable range of the wireless communication device 34 due to another affair, e.g. a case that the administrator user 101a simply passes through the communicable range, then administrator user authority is not provided to the general user 101.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, if the mobile identification device 1a with the administrator user authority gets not detected after changing the user authority of the login user from general user authority to administrator user authority, then the user authority of the login user is changed from administrator user authority to general user authority. Alternatively, even if the mobile identification device 1a with the administrator user authority gets not detected after changing the user authority of the login user from general user authority to administrator user authority, then the authority changing unit 54 may keep the user authority of the login user as administrator user authority until performing a logout process for the user.

What is claimed is:

1. An image forming apparatus, comprising:
    a wireless communication device;
    a user detecting unit configured to (a) detect a mobile identification device in a communicable range of the wireless communication device, and (b) determine a user in association with the detected mobile identification device and determine user authority of the user among general user authority and administrator user authority, the general user authority prohibited from using a specific function and the administrator user authority allowed to use the specific function;
    a login processing unit configured to perform a login process based on the user authority for the user determined by the user detecting unit; and
    an authority changing unit configured to change the user authority of the user from the general user authority to the administrator user authority if (a) the mobile identification device with the administrator user authority is detected by the user detecting unit after the login process was performed based on the general user authority and (b) a distance is less than a predetermined value between the detected mobile identification device with the general user authority and the detected mobile identification device with the administrator user authority.

2. The image forming apparatus according to claim 1, wherein while (a) the mobile identification device with the administrator user authority is detected by the user detecting unit after the login process was performed based on the general user authority and (b) a distance is less than a predetermined value between the detected mobile identification device with the general user authority and the detected mobile identification device with the administrator user authority, after detecting a predetermined user operation, the authority changing unit changes the user authority of the user from the general user authority to the administrator user authority.

3. The image forming apparatus according to claim 1, wherein after changing the user authority of the user for whom the login process was performed based on the general user authority from the general user authority to the administrator user authority, when the mobile identification device with the administrator user authority gets not detected, the authority changing unit changes the user authority of the user from the administrator user authority to the general user authority.

4. The image forming apparatus according to claim 1, wherein after changing the user authority of the user for whom the login process was performed based on the general user authority from the general user authority to the administrator user authority, even when the mobile identification device with the administrator user authority gets not detected, the user authority of the user is kept as the administrator user authority until performing a logout process for the user.

5. The image forming apparatus according to claim 1, wherein after changing the user authority of the user for whom the login process was performed based on the general user authority from the general user authority to the administrator user authority, when the mobile identification device with the general user authority gets not detected, the login processing unit performs a logout process for the user.

6. The image forming apparatus according to claim 1, wherein if the mobile identification device with the administrator user authority is detected by the user detecting unit after performing the login process based on the general user authority, then (a) the login processing unit does not perform the login process for the user of the detected mobile identification device with the administrator user authority, and (b) the authority changing unit changes the user authority of the user for whom the login process was performed with the general user authority from the general user authority to the administrator user authority if a distance is less than a predetermined value between the detected mobile identification device with the general user authority and the detected mobile identification device with the administrator user authority.

\* \* \* \* \*